United States Patent
Shao et al.

(10) Patent No.: US 12,412,366 B2
(45) Date of Patent: *Sep. 9, 2025

(54) INDUSTRIAL INTERNET OF THINGS (IIoT) SYSTEM FOR INDUSTRIAL PRODUCTION DATA MANAGEMENT, CONTROL METHOD, AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Yuefei Wu, Chengdu (CN); Yaqiang Quan, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 100 days.

This patent is subject to a terminal disclaimer.

(21) Appl. No.: 18/498,112

(22) Filed: Oct. 31, 2023

(65) Prior Publication Data

US 2024/0062513 A1 Feb. 22, 2024

Related U.S. Application Data

(63) Continuation of application No. 17/821,470, filed on Aug. 22, 2022, now Pat. No. 11,842,527.

(30) Foreign Application Priority Data

Jul. 11, 2022 (CN) .......................... 202210806993.6

(51) Int. Cl.
*G06V 10/74* (2022.01)
*G06F 21/60* (2013.01)
(Continued)

(52) U.S. Cl.
CPC .......... *G06V 10/761* (2022.01); *G06F 21/602* (2013.01); *G06V 10/40* (2022.01);
(Continued)

(58) Field of Classification Search
CPC ........ G06V 10/76; G06V 10/25; G06V 10/40; G06V 10/764; G06V 2201/06; G16Y 30/10; G06F 21/602; H04L 67/12
(Continued)

(56) References Cited

U.S. PATENT DOCUMENTS 11,068,742 B2 7/2021 Lee et al.
11,522,958 B1 12/2022 Pope et al.
(Continued)

FOREIGN PATENT DOCUMENTS

AU 2021101149 A4 5/2021
CN 112099449 A 12/2020
(Continued)

OTHER PUBLICATIONS

Seongwoon Jeong et al., An IoT Platform for Civil Infrastructure Monitoring, 2018 IEEE 42nd Annual Computer Software & Applications, 2018, 9 pages.
(Continued)

*Primary Examiner* — Khalil Naghdali
(74) *Attorney, Agent, or Firm* — PORUS IP LLC

(57) ABSTRACT

The present disclosure discloses Industrial Internet of Things (IIoT) system for industrial production data management, control method, and storage medium. By adopting different encryption methods for different image data, and without changing the overall architecture of the cloud computing Internet of Things, the safe penetration of sensitive data on the cloud computing platform is realized, which effectively improves the security of sensitive data. In addition, it does not require additional wiring, reducing the
(Continued)

networking cost of the Internet of Things, which has high applicability.

19 Claims, 7 Drawing Sheets

(51) Int. Cl.
  *G06V 10/40* (2022.01)
  *G06V 10/764* (2022.01)
  *G16Y 10/25* (2020.01)
  *G16Y 30/10* (2020.01)
  *H04L 67/12* (2022.01)
(52) U.S. Cl.
  CPC .......... *G06V 10/764* (2022.01); *G16Y 10/25* (2020.01); *G16Y 30/10* (2020.01); *H04L 67/12* (2013.01); *G06V 2201/06* (2022.01)
(58) Field of Classification Search
  USPC .......................................................... 380/54
  See application file for complete search history.

(56) References Cited

U.S. PATENT DOCUMENTS

| | | | |
|---|---|---|---|
| 2020/0120267 A1* | 4/2020 | Stelmar Netto | G06T 7/0012 |
| 2020/0177765 A1* | 6/2020 | Kang | H04N 1/4413 |
| 2021/0004953 A1 | 1/2021 | Pathan et al. | |

FOREIGN PATENT DOCUMENTS

| | | |
|---|---|---|
| CN | 112688945 A | 4/2021 |
| CN | 112954048 A | 6/2021 |
| CN | 113364590 A | 9/2021 |
| CN | 113438255 A | 9/2021 |
| CN | 114218592 A | 3/2022 |
| CN | 114629940 A | 6/2022 |

OTHER PUBLICATIONS

Shao, Zehua et al., Research on Gateway Technology for IoT Operation System of Intelligent Gas Meter, Gas & Heat, 42(4): B32-B34, B42, 2022.

Shao, Zehua et al., Design of Intelligent Gas Meter Internet of Things System, Internet of Things Technologies, 2021, 12 pages.

Feng, Na, Algorithm of Image Information Encryption and Compression Based on Transmission Layer in Internet of Things, Journal of Heilongjiang University of Technology, 20(4): 85-88, 2020.

Wang, Fei, Application of Level Protection Technology under the Internet of Things Technology System, Telecommunications Network Technology, 2014, 15 pages.

Manju Khari et al., Securing Data in Internet of Things (IoT) Using Cryptography and Steganography Techniques, IEEE Transactions on Systems, Man, and Cybernetics: Systems, 2019, 8 pages.

M. Hassaballah et al., A Novel Image Steganography Method for Industrial Internet of Things Security, IEEE Transactions on Industrial Informatics, 2021, 9 pages.

* cited by examiner

300

```
┌─────────────────────────────────────────────────────────┐
│ The general platform of the sensor network platform     │
│ receiving the image data of a production line detected  │
│ by sensors of the production line, and identifying the  │ S1
│ image data of a production line as the first image data │
│ and the second image data; the first image data being   │
│ image data that requires the management platform to     │
│ perform identification processing; and the second image │
│ data being the image data that requires to be encrypted │
│ and transmitted to the service platform                 │
└─────────────────────────────────────────────────────────┘
                            ↓
┌─────────────────────────────────────────────────────────┐
│ The general platform of the sensor network platform     │
│ encrypting and storing the second image data into the   │ S2
│ first image data to form the third image data, and      │
│ sending the third image data to the corresponding sub   │
│ platforms of the sensor network platform according to   │
│ the types of the third image data                       │
└─────────────────────────────────────────────────────────┘
                            ↓
┌─────────────────────────────────────────────────────────┐
│ The sub platforms of the sensor network platform        │ S3
│ forwarding the received third image data to the         │
│ management platform                                     │
└─────────────────────────────────────────────────────────┘
                            ↓
┌─────────────────────────────────────────────────────────┐
│ The management platform identifying the third image     │ S4
│ data to generate the control parameters, and sending    │
│ the control parameters to the production line through   │
│ the sensor network platform                             │
└─────────────────────────────────────────────────────────┘
                            ↓
┌─────────────────────────────────────────────────────────┐
│ The management platform sending the third image data    │ S5
│ to the service platform                                 │
└─────────────────────────────────────────────────────────┘
                            ↓
┌─────────────────────────────────────────────────────────┐
│ The sub platforms of the service platform receiving the │ S6
│ third image data and decrypting the corresponding       │
│ second image data from the third image data            │
└─────────────────────────────────────────────────────────┘
                            ↓
┌─────────────────────────────────────────────────────────┐
│ The general platform of the service platform            │ S7
│ summarizing all the second image data and presenting    │
│ the second image data to the user platform              │
└─────────────────────────────────────────────────────────┘
```

FIG. 3

INDUSTRIAL INTERNET OF THINGS (IIoT) SYSTEM FOR INDUSTRIAL PRODUCTION DATA MANAGEMENT, CONTROL METHOD, AND STORAGE MEDIUM THEREOF

CROSS-REFERENCE TO RELATED APPLICATIONS

The application is a continuation of U.S. application Ser. No. 17/821,470, filed on Aug. 22, 2022, which claims priority to Chinese Patent Application No. 202210806993.6, filed on Jul. 11, 2022, the contents of which are hereby incorporated by reference to its entirety.

TECHNICAL FIELD

The present disclosure generally relates to Industrial Internet of Things technology, in particular to Industrial Internet of Things system for industrial production data management, control method, and storage medium thereof.

BACKGROUND

Industrial Internet of Things (IoT) manufacturing may be the development direction of manufacturing in the future. Integrating IoT technology into all links of industrial production can greatly improve manufacturing efficiency. However, with the increase of the complexity of the production line, it may be necessary to improve the robustness of the production line control under high complexity, which depends on the timeliness and accuracy of joint control calculation, so the existing technology began to introduce cloud computing technology into the Industrial Internet of Things. However, if you want to carry out large-scale cloud computing, many production line data will be uploaded to the cloud, which makes some sensitive data have security risks.

SUMMARY

In order to overcome at least the above shortcomings in the prior art, the purpose of the present disclosure is to provide an Industrial Internet of Things (IIoT) system for industrial production data management, control method, and storage media thereof.

One embodiment of the present disclosure provides an IIoT system for industrial production data management. The IIoT system comprises: a non-transitory computer-readable storage medium storing executable instructions; and at least one processor in communication with the non-transitory computer-readable storage medium, when executing the executable instructions, the at least one processor is directed to cause the IIoT system to: identify first image data and second image data based on image data of a production line; encrypt the second image data to form third image data; decrypt the third image data to form decrypted second image data; obtain reference image data; determine image similarities through image feature processing based on the decrypted second image data and the reference image data, wherein the image similarities include first image similarities and second image similarities, and the second image similarities are determined by a judgment model based on the decrypted second image data and the reference image data, wherein the judgment model is a machine learning model; and obtain target images based on the image similarities and send the target images to a user platform.

In an aspect, some embodiments of the present disclosure provide an IIoT system for industrial production data management, comprising: a service platform, a management platform, and a sensor network platform that are interacted sequentially from top to bottom, the sensor network platform includes a general platform of the sensor network platform and a plurality of sub platforms of the sensor network platform, and the service platform includes a general platform of the service platform and a plurality of sub platforms of the service platform. The at least one processor is further directed to cause the IIoT system to: receive the image data of the production line detected by sensors of the production line, and identify the image data of the production line as the first image data and the second image data, wherein the first image data is image data that requires the management platform to perform identification processing, and the second image data is image data that requires to be encrypted and transmitted to the service platform; encrypt and store the second image data into the first image data to form the third image data, and send the third image data to corresponding sub platforms of the sensor network platform according to types of the third image data; forward the received third image data to the management platform; identify the third image data to generate control parameters, and send the control parameters to the production line through the sensor network platform; send the third image data to the service platform; receive the third image data and decrypt the corresponding second image data from the third image data; and summarize all the second image data and present the second image data to a user platform.

In existing technology, cloud computing may mainly aim at processing of relevant data of the production line and correction of relevant parameters of the production line. For many production lines, it only needs to care about images of parts entering the production line and images after processing to judge the production of products. If images produced in each link of the production line are made public, a production process as a trade secret is exposed. Therefore, these data should not be provided to cloud computing platforms. However, if separate communication lines are set up for different production line data, on the one hand, a communication cost may be very high, on the other hand, laying of lines may be too complex, which may be not conducive to a design of production workshops.

During implementation of some embodiments of the present disclosure, a five-platform structure designed and used by the inventor is adopted for the implementation, which will not be repeated here. The management platform adopts centralized setting and is set in a cloud, and relevant parameters of the production line may be modified through image identification. A specific method may be carried out in ways of the existing technology. The embodiments of the present disclosure will not be repeated here. The sensor network platform may adopt a post-split design, that is, production line data may be received and processed through the general platform of the sensor network platform, and then distributed and transmitted to a cloud management platform through the sub platforms of the sensor network platform. The service platform may adopt a front-split design, that is, after receiving and processing required data through the sub platforms of the service platform, the data may be summarized by the general platform of the service platform and transmitted to the user platform for presentation. In some embodiments of the present disclosure, transmitted data may be mainly the image data. For example, the image data of a production line detected by the sensors of the production line may include one or more first link images, one or more second link images, one or more third link images, one or more fourth link images, and one or more fifth link images. The management platform in a cloud may need the one or more first link images and the one or more fifth link images to calculate conformity of the product and adjust corresponding parameters. The one or more second link images, the one or more third link images, and the one or more fourth link images belong to one or more intermediate images of different links in the production line. Source of the one or more second link images, the one or more third link images, and the one or more fourth link images may be images generated during machine vision identification, which may characterize a whole process of the production line and belong to confidential data that is not easy to be disclosed.

In some embodiments of the present disclosure, the image data of the production line may be identified through the general platform of the sensor network, and an identification method may be generally an identification of a device ID. The specific process of the embodiments of the present disclosure may be not repeated. Identified image data may be classified into the first image data and the second image data. For example, based on the identification of the above example, the first image data may be the one or more first link images and the one or more fifth link images, and the second image data may be the one or more second link images, the one or more third link images, and the one or more fourth link images. Then, the second image data may be encrypted and stored into the first image data by a manner of encryption and storage. The manner of encryption and storage may generate the third image data by histogram encryption, fusion encryption, and other methods. As an example, the one or more second link images and the one or more third link images may be encrypted and stored in the one or more first link images, and the one or more fourth link images may be encrypted and stored in the one or more fifth link images.

In some embodiments of the present disclosure, the management platform configured in the cloud may correct the control parameters of the production line after identifying the third image data, and the second image data may not be found from the third image data in absence of relevant decryption information. The sub platforms of the service platform may be configured with relevant decryption keys to decrypt the second image data from the third image data, and present decrypted second image data to the user platform after being summarized by the general platform of the service platform. For example, decryptions may be performed based on identification of the above example. The sub platforms of the service platform may include a sub platform of the service platform A, a sub platform of the service platform B, and a sub platform of the service platform C, the decryption keys configured by the sub platform of the service platform A may be used to decrypt the one or more second link images, the decryption keys configured by the sub platform of the service platform B may be used to decrypt the one or more third link images, and the decryption keys configured by the sub platform of the service platform C may be used to decrypt the one or more fourth link images. The sub platform of the service platform A, the sub platform of the service platform B, and the sub platform of the service platform C may receive same third image data and parse the one or more second link images, the one or more third link images, and the one or more fourth link images respectively according to their own decryption keys. Through above technical schemes, some embodiments of the present disclosure realize safe penetration of sensitive data on the cloud computing platforms without changing an overall architecture of a cloud computing Internet of Things to effectively improve the security of sensitive data, and does not need additional line setup to reduce a networking cost of the Internet of Things, which has high applicability.

One of the embodiments of the present disclosure provides a control method of an IIoT system for industrial production data management, wherein the method is executed by at least one processor of the IIoT system, comprising: identifying first image data and second image data based on image data of a production line; encrypting the second image data to form third image data; decrypting the third image data to form decrypted second image data; searching one or more target images in the decrypted second image data; obtaining reference image data; determining image similarities through image feature processing based on the decrypted second image data and the reference image data, wherein the image similarities include first image similarities and second image similarities, and the second image similarities are determined by a judgment model based on the decrypted second image data and the reference image data, wherein the judgment model is a machine learning model; and obtaining target images based on the image similarities and send the target images to a user platform.

In the other aspect, some embodiments of the present disclosure provide a control method of an IIoT system for industrial production data management, the method is applied to a service platform, a management platform, and a sensor network platform that are interacted sequentially from top to bottom, the sensor network platform includes a general platform of the sensor network platform and a plurality of sub platforms of the sensor network platform; and the service platform includes a general platform of the service platform and a plurality of sub platforms of the service platform. The method comprises: receiving, by the general platform of the sensor network platform, the image data of the production line detected by sensors of the production line, and identifying the image data of the production line as the first image data and the second image data, wherein the first image data is image data that requires the management platform to perform identification processing, and the second image data is image data that requires to be encrypted and transmitted to the service platform; encrypting and storing, by the general platform of the sensor network platform, the second image data into the first image data to form the third image data, and sending the third image data to corresponding sub platforms of the sensor network according to types of the third image data; forwarding, by the sub platforms of the sensor network platform, the received third image data to the management platform; identifying, by the management platform, the third image data to generate control parameters, and sending the control parameters to the production line through the sensor network platform; sending, by the management platform, the third image data to the service platform; receiving, by the sub platforms of the service platform, the third image data and decrypting the corresponding second image data from the third image data; and summarizing, by the general platform of the sensor network platform, all the second image data and presenting the second image data to a user platform.

One of the embodiments of the present disclosure provides a non-transitory computer-readable storage medium, which stores computer instructions. When the computer reads the computer instructions in the storage medium, the computer executes the control method of the IIoT system for industrial production data management.

Compared with the prior art, the present disclosure has the following advantages and beneficial effects.

The IIoT system for industrial production data management, control methods, and storage media of the present disclosure realize the safe penetration of sensitive data on the cloud computing platform without changing the overall architecture of the cloud computing Internet of things to effectively improve the security of sensitive data, and does not require additional line setup to reduce the networking cost of the Internet of things, which has high applicability.

BRIEF DESCRIPTION OF THE DRAWINGS

The accompanying drawings described herein is intended to provide a further understanding of some embodiments of the present disclosure, constitute a part of the present disclosure, and do not constitute a limitation of some embodiments of the present disclosure. In the accompanying drawings:

FIG. 3 is an exemplary flowchart of a control method of an Industrial Internet of Things based on platform linkage according to some embodiments of the present disclosure;

DETAILED DESCRIPTION

Figure 1:
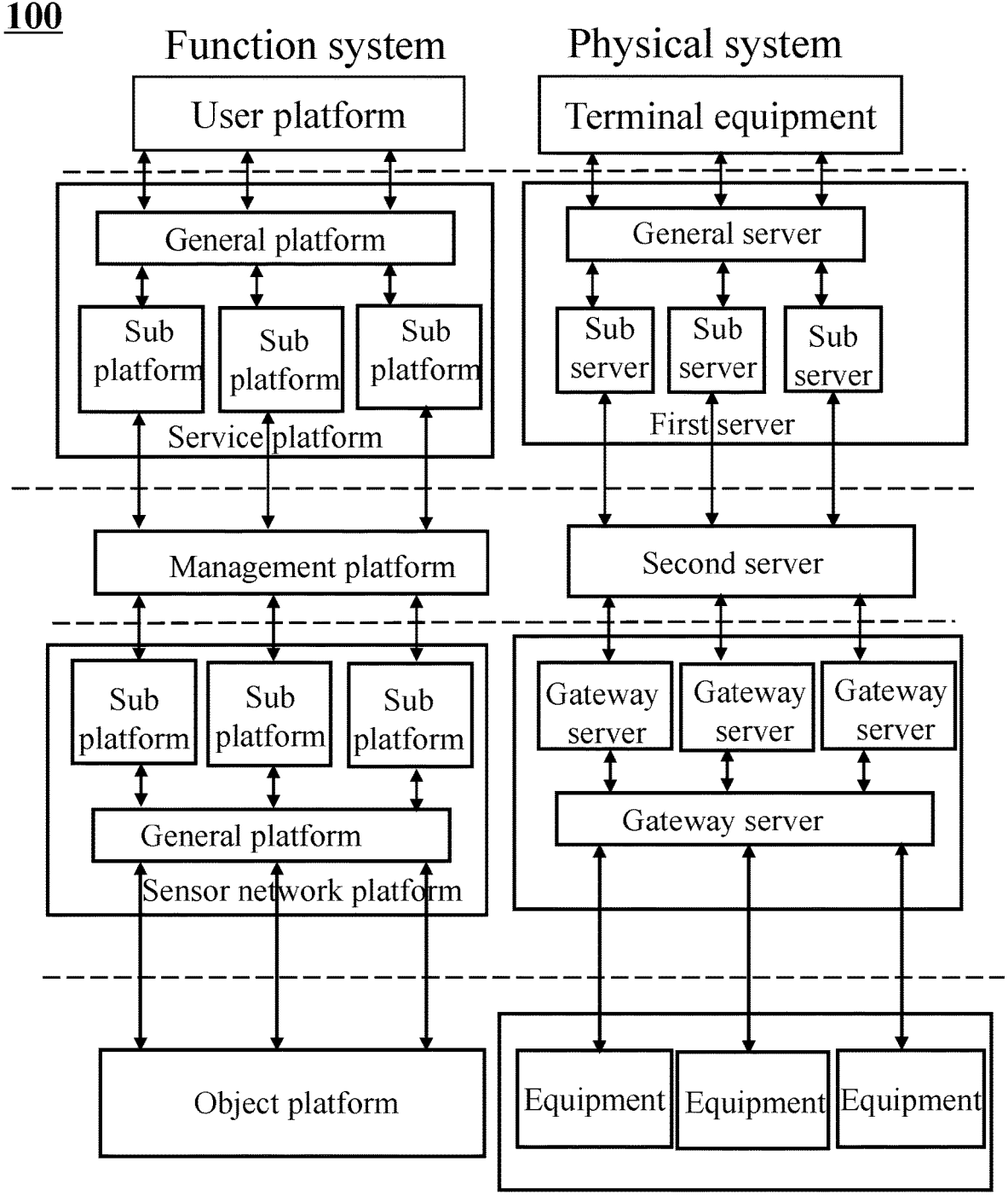
FIG. 1 is a schematic diagram of a system architecture of an Industrial Internet of Things based on platform linkage according to some embodiments of the present disclosure.

In order to make the purpose, technical scheme, and advantages of the embodiments of the present disclosure more clear, the technical scheme in the embodiments of the present disclosure will be clearly and completely described below in combination with the accompanying drawings in the embodiments of the present disclosure. It should be understood that the accompanying drawings in the present disclosure are only for the purpose of explanation and description and not used to limit the scope of protection of the present disclosure. In addition, it should be understood that the schematic drawings are not drawn to the scale of the real object. The flowchart used in the present disclosure shows operations implemented according to some embodiments of the embodiments of the present disclosure. It should be understood that the operations of the flowchart can be implemented out of order, and the steps without logical context can be reversed or implemented at the same time. In addition, those skilled in the art can add one or more other operations to the flowchart or remove one or more operations from the flowchart under the guidance of the contents of the present disclosure.

In addition, the described embodiments are only part of the embodiments of the present disclosure, not all of them. The components of the embodiments of the present disclosure, which are generally described and shown in the accompanying drawings herein, may be arranged and designed in different configurations. Therefore, the following detailed description of the embodiments of the present disclosure provided in the accompanying drawings is not intended to limit the scope of the present disclosure that requires protection, but only represents selected embodiments of the present disclosure. Based on the embodiments of the present disclosure, all other embodiments obtained by those skilled in the art without making creative work fall within the scope of protection of the present disclosure.

In some embodiments, the Industrial Internet of Things based on platform linkage may include an identification module, an encryption module, a decryption module, and a search module.

In some embodiments, the identification module may be configured to identify first image data and second image data based on image data of a production line.

In some embodiments, the encryption module may be configured to encrypt the second image data to form third image data.

In some embodiments, the decryption module may be configured to decrypt the third image data to form decrypted second image data.

In some embodiments, the search module may be configured to search for one or more target images in the decrypted second image data. For more information about the identification module, encryption module, decryption module, and search module, please see FIG. 2 and its related descriptions.

In some embodiments, the search module may be further configured to obtain the decrypted second image data and reference image data. Based on the decrypted second image data and reference image data, one or more image similarities may be determined through image feature processing. Based on the one or more image similarities, the one or more target images may be obtained and sent to a user platform.

In some embodiments, the one or more image similarities may include one or more first image similarities. The search module may be further configured to extract the first features corresponding to the decrypted second image data based on the decrypted second image data, extract second features corresponding to the reference image data based on the reference image data, and determine the one or more first image similarities based on the first features and the second features.

In some embodiments, the one or more image similarities may include one or more second image similarities. The search module may be further configured to determine the one or more second image similarities by a judgment model based on the decrypted second image data and the reference image data, and the judgment model may be a machine learning model.

In some embodiments, the judgment model may include a feature extraction layer and a similarity judgment layer. The feature extraction layer may be configured to process the decrypted second image data and the reference image data to determine a third feature vector corresponding to the decrypted second image data and a fourth feature vector corresponding to the reference image data. The similarity judgment layer may be configured to process the third feature vector and the fourth feature vector to determine the one or more second image similarities.

In some embodiments, the Industrial Internet of Things based on platform linkage may also comprise a training module. The training module may be executed by the service platform. The training module may be configured to obtain a plurality of groups of training data and corresponding labels of the plurality of groups of training data. Each group of the training data in the plurality of groups of training data includes two sample image data, and labels may be a similarity of the two sample image data. Based on the plurality of groups of training data, an initial judgment model may be trained to obtain the judgment model.

In some embodiments, the training module may be further configured to determine the plurality of groups of training data based on a process map. Nodes of the process map may include image nodes, feature nodes, and feature type nodes, and edge of the process map may be used to connect two associated nodes. The image nodes may correspond to historical process images, node attributes of the feature nodes may include process parameter values and/or product parameter values, and node attributes of the feature type nodes may include one or more types of process parameters or product parameters.

In some embodiments, the training module may be further configured to obtain common feature nodes and difference feature nodes of two historical process images based on the process map. First number of the common feature nodes are determined based on the common feature nodes, and second number of the difference feature nodes belonging to a same feature type in the difference feature nodes are determined based on the difference feature nodes. A first judgment result is determined based on the first number and a first preset threshold, a second judgment result is determined based on the second number and a second preset threshold, and the plurality of groups of training data are determined based on the first judgment result and the second judgment result.

In some embodiments, the search module may be further configured to obtain decrypted second image data corresponding to a maximum similarity between decrypted second image data and the reference image data or corresponding decrypted second image data whose similarity is higher than a preset threshold. One or more images of the corresponding decrypted second image data are taken as the one or more target images.

FIG. 1 is a schematic diagram of a system architecture of an Industrial Internet of Things based on platform linkage according to some embodiments of the present disclosure.

In order to facilitate illustrations of the above-mentioned Industrial Internet of Things based on platform linkage, referring to FIG. 1, FIG. 1 provides the schematic diagram of a communication architecture of the Industrial Internet of Things disclosed in an embodiment of the present disclosure. The Industrial Internet of Things may include a service platform, a management platform, and a sensor network platform which are interacted sequentially from top to bottom. The service platform may also interact with the user platform as a user terminal, and the sensor network platform may also interact with the object platform as the production line.

The identification module and the encryption module may be executed by the sensor network platform. The decryption module and the search module may be executed by the service platform. The sensor network platform may include a general platform of the sensor network platform and a plurality of sub platforms of the sensor network platform.

The service platform may include a general platform of the service platform and a plurality of sub platforms of the service platform.

The general platform of the sensor network platform may be configured to receive the image data of a production line detected by sensors of the production line and identify the image data of a production line as the first image data and the second image data. The first image data may be image data that requires the management platform to perform identification processing, and the second image data may be image data that requires to be encrypted and transmitted to the service platform.

The general platform of the sensor network platform may be configured to encrypt and store the second image data into the first image data to form the third image data, and send the third image data to corresponding sub platforms of the sensor network platform according to types of the third image data.

The sub platforms of the sensor network platform may be configured to forward received third image data to the management platform.

The management platform may be configured to identify the third image data to generate control parameters, and send the control parameters to the production line through the sensor network platform.

The management platform may be further configured to send the third image data to the service platform.

The sub platforms of the service platform may be configured to receive the third image data and decrypt corresponding second image data from the third image data.

The general platform of the service platform may be configured to summarize all the second image data and present the second image data to the user platform.

In existing technology, cloud computing may mainly aim at processing of relevant data of the production line and correction of relevant parameters of the production line. For many production lines, it only needs to care about images of parts entering the production line and images after processing to judge the production of products. If images produced in each link of the production line are made public, a production process as a trade secret is exposed. Therefore, these data should not be provided to cloud computing platforms. However, if separate communication lines are set up for different production line data, on the one hand, a communication cost may be very high, on the other hand, laying of lines may be too complex, which may be not conducive to a design of production workshops.

During implementation of some embodiments of the present disclosure, a five-platform structure designed and used by the inventor is adopted for the implementation, which will not be repeated here. The management platform adopts centralized setting and is set in a cloud, and relevant parameters of the production line may be modified through image identification. A specific method may be carried out in ways of the existing technology. The embodiments of the present disclosure will not be repeated here. The sensor network platform may adopt a post-split design, that is, production line data may be received and processed through the general platform of the sensor network platform, and then distributed and transmitted to a cloud management platform through the sub platforms of the sensor network platform. The service platform may adopt a front-split design, that is, after receiving and processing required data through the sub platforms of the service platform, the data may be summarized by the general platform of the service platform and transmitted to the user platform for presentation. In some embodiments of the present disclosure, transmitted data may be mainly the image data. For example, the image data of a production line detected by the sensors of the production line may include one or more first link images, one or more second link images, one or more third link images, one or more fourth link images, and one or more fifth link images. The management platform in a cloud may need the one or more first link images and the one or more fifth link images to calculate conformity of the product and adjust corresponding parameters. The one or more second link images, the one or more third link images, and the one or more fourth link images belong to one or more intermediate images of different links in the production line. Source of the one or more second link images, the one or more third link images, and the one or more fourth link images may be images generated during machine vision identification, which may characterize a whole process of the production line and belong to confidential data that is not easy to be disclosed.

In some embodiments of the present disclosure, the image data of the production line may be identified through the general platform of the sensor network, and an identification method may be generally an identification of a device ID. The specific process of the embodiments of the present disclosure may be not repeated. Identified image data may be classified into the first image data and the second image data. For example, based on the identification of the above example, the first image data may be the one or more first link images and the one or more fifth link images, and the second image data may be the one or more second link images, the one or more third link images, and the one or more fourth link images. Then, the second image data may be encrypted and stored into the first image data by a manner of encryption and storage. The manner of encryption and storage may generate the third image data by histogram encryption, fusion encryption, and other methods. As an example, the one or more second link images and the one or more third link images may be encrypted and stored in the one or more first link images, and the one or more fourth link images may be encrypted and stored in the one or more fifth link images.

In some embodiments of the present disclosure, the management platform configured in the cloud may correct the control parameters of the production line after identifying the third image data, and the second image data may not be found from the third image data in absence of relevant decryption information. The sub platforms of the service platform may be configured with relevant decryption keys to decrypt the second image data from the third image data, and present decrypted second image data to the user platform after being summarized by the general platform of the service platform. For example, decryptions may be performed based on identification of the above example. The sub platforms of the service platform may include a sub platform of the service platform A, a sub platform of the service platform B, and a sub platform of the service platform C, the decryption keys configured by the sub platform of the service platform A may be used to decrypt the one or more second link images, the decryption keys configured by the sub platform of the service platform B may be used to decrypt the one or more third link images, and the decryption keys configured by the sub platform of the service platform C may be used to decrypt the one or more fourth link images. The sub platform of the service platform A, the sub platform of the service platform B, and the sub platform of the service platform C may receive same third image data and parse the one or more second link images, the one or more third link images, and the one or more fourth link images respectively according to their own decryption keys. Through above technical schemes, some embodiments of the present disclosure realize safe penetration of sensitive data on the cloud computing platforms without changing an overall architecture of a cloud computing Internet of Things to effectively improve the security of sensitive data, and does not need additional line setup to reduce a networking cost of the Internet of Things, which has high applicability.

In some embodiments, the second image data and the first image data may be both plural. The general platform of the sensor network platform may be configured with a plurality of serial numbers of the first image data. The general platform of the sensor network platform may be configured with the encryption keys corresponding to different second image data.

When the general platform of the sensor network platform encrypts and stores the second image data into the first image data to form the third image data, the general platform of the sensor network platform may encrypt and store the second image data into the first image data according to encryption keys corresponding to the second image data, and assign the serial numbers corresponding to the first image data to corresponding third image data.

The general platform of the sensor network platform may classify the third image data according to the serial numbers of the third image data, and send the third image data to corresponding sub platforms of the sensor network platform according to the types of the third image data.

During the implementation of some embodiments of the present disclosure, in order to facilitate the service platform to identify the third image data in subsequent, the serial numbers of the first image data may be configured on the general platform of the sensor network to facilitate the service platform to identify the third image data based on the serial numbers in subsequent. In some embodiments of the present disclosure, each second image data corresponds to an encryption key, and each sub platform of the service platform may hold different decryption keys to decrypt different second image data for different purposes or present in different places. In some embodiments of the present disclosure, the serial numbers may be assigned to the third image data by modifying pixel values at preset positions of the third image data, or by encoding other parts of the third image data.

In some embodiments, the sub platforms of the service platform may be configured with decryption keys corresponding to different second image data.

When the sub platforms of the service platform receive all the third image data, the sub platforms of the service platform may identify the third image data according to the serial numbers of the third image data, and extract the second image data from identified third image data according to the decryption keys.

During the implementation of some embodiments of the present disclosure, in order to prevent the cloud management platform from obtaining relevant information of the second image data, it may be necessary to send all the third image data to all sub platforms of the service platform that need to decrypt the second image data without difference. The sub platforms of the service platform may identify the third image data according to the serial numbers, and then extract the second image data by decrypting the decryption keys. For example, decryptions may be performed based on identification of the above example. In some embodiments, the sub platforms of the service platform may include a sub platform of the service platform A, a sub platform of the service platform B, and a sub platform of the service platform C, the decryption keys configured by the sub platform of the service platform A may be used to decrypt the one or more second link images, the decryption keys configured by the sub platform of the service platform B may be used to decrypt the one or more third link images, and the decryption keys configured by the sub platform of the service platform C may be used to decrypt the one or more fourth link images. The one or more first link images storing the one or more second link images and the one or more third link images may be taken as the third image data with serial number of 11, and the one or more fifth link images storing the one or more fourth link images may be taken as the third image data with serial number of 12. The sub platform of the service platform A and the sub platform of the service platform B may identify the third image data with the serial number of 11, and the sub platform of the service platform C may identify the third image data with the serial number of 12, and decrypt the images.

In some embodiments, the encryption keys may be configured as a first target pixel column and a second target pixel column.

When the general platform of the sensor network platform encrypts and stores the second image data into the first image data to form the third image data, the general platform of the sensor network platform may obtain pixel values of all pixels of the second image data as first pixel values, and sort the first pixel values according to positions of the corresponding pixels to form a first pixel sequence.

The general platform of the sensor network platform may extract pixel values corresponding to the first target pixel column from the first image data as a plurality of second pixel values, and extract pixel values corresponding to the second target pixel column as a plurality of third pixel values.

The general platform of the sensor network general may obtain absolute values of differences between the third pixel values and corresponding second pixel values as differences to be corrected. A plurality of the differences to be corrected may be sorted along the first target pixel column to form a second pixel sequence.

The general platform of the sensor network platform may assign the first pixel values to the differences to be corrected to form encrypted differences according to a corresponding relationship between the first pixel sequence and the second pixel sequence.

The general platform of the sensor network platform may synchronously adjust the third pixel values and the second pixel values to form the third image data according to the encrypted differences.

When the embodiments of the present disclosure are implemented, it provides a specific and unique encryption scheme, that is, using pixel value differences between the first target pixel column and the second target pixel column to encrypt and store the second image data. The first target pixel column and the second target pixel column may be whole columns or partial columns. Number of rows of the first target pixel column and the second target pixel column should be the same, and pixels in the first target pixel column and the second target pixel column should be one-to-one correspondence. In some embodiments of the present disclosure, the second image data may be digitized based on the prior art, that is, the first pixel values may be sorted, and a sorting method may be sequential, reverse, or any other agreed sorting method.

In some embodiments of the present disclosure, the actual purpose may be to convert corresponding pixel value differences between the first target pixel column and the second target pixel column into the first pixel values, so as to realize a storage of the second image data. In practice, it is found that if a single column storage method in the prior art is adopted, it may be easy to have obvious traces of processing on the third image data, and the problem may also occur in encryption based on histogram. Therefore, in some embodiments of the present disclosure, it may be equivalent to averaging changes of pixel values to two columns of pixels, so that the changes may be small, the changes may be not easy to be directly identified in the cloud, and even if the changes are identified, the changes may be difficult to parse the second image data through these pixel columns. It should be understood that a plurality of second image data may be stored on a same first image data, so that a number of corresponding first target pixel columns and second target pixel columns may be larger, which may be more conducive to hiding of the second image data. As a specific implementation scheme, the pixel values in some embodiments of the present disclosure may adopt gray value or other color space values, and some embodiments of the present disclosure are not limited here.

In some embodiments of the present disclosure, a synchronous adjustment may be adopted to adjust the third pixel values and the second pixel values at a same time until absolute values of differences between the third pixel values and the second pixel values satisfy the first pixel values, an adjustment method may be to take absolute values of differences between the differences to be corrected and the first pixel values as the encrypted differences, and then subtract one-half of the encrypted differences from the third pixel values, then the second pixel values plus one-half of the encrypted differences to complete assignments. For example, when a first pixel value is 100, a third pixel value is 200, and a second pixel value is 50, then a difference between the third pixel value and the second pixel value may be 150, at the time, the difference 150 may need to be replaced by the first pixel value 100, then the third pixel value may be corrected to 175, and the second pixel value may be corrected to 75.

In some embodiments, when the sub platforms of the service platform receive all the third image data, the sub platforms of the service platform may identify the third image data according to the serial numbers of the third image data, and may identify the first target pixel column and the second target pixel column from the third image data according to the decryption keys configured on the sub platforms of the service platform.

The sub platforms of the service platform may restore the second image data according to identified differences between the first target pixel column and the second target pixel column.

Figure 2:
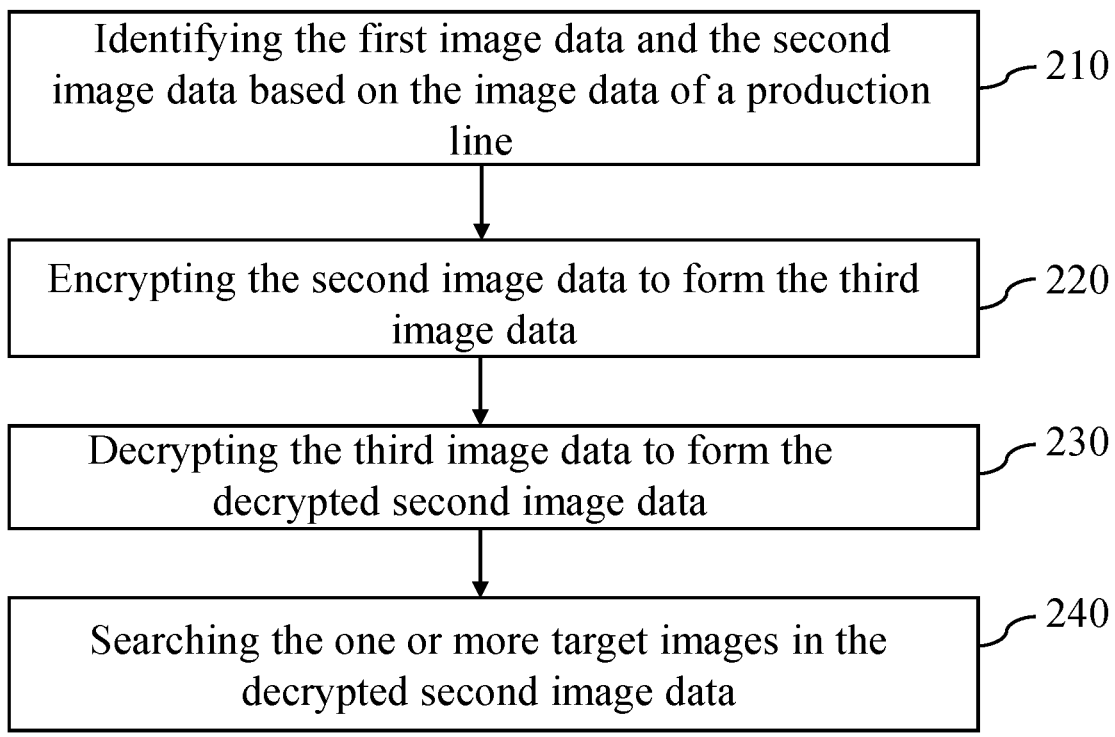
FIG. 2 is an exemplary flowchart of a control method of an Industrial Internet of Things based on platform linkage according to some embodiments of the present disclosure.

FIG. 2 is an exemplary flowchart of a control method of an Industrial Internet of Things based on platform linkage according to some embodiments of the present disclosure. As shown in FIG. 2, the process 200 includes the following operations.

In 210, the first image data and the second image data are identified based on the image data of a production line. In some embodiments, operation 210 may be performed by the identification module.

The image data of the production line may refer to image data of different links of the production line. In some embodiments, sensors of the production line may detect image data of different links on the production line.

The first image data may refer to image data that does not need to be encrypted. The second image data may refer to image data that needs to be encrypted. For example, the second image data may be image data of an intermediate link of the production line, the image data involving key technical links, etc.

In some embodiments, the identification module may identify the first image data and the second image data based on identification number (ID) of the sensors of the production line corresponding to the image data of a production line. In some embodiments, the identification module may identify corresponding images according to the identification number (ID) of the corresponding sensors of the production line based on needs. For example, when identifying the second image data, the identification module may identify the second image data from sensors of the production line corresponding to the key technical links.

In 220, the second image data is encrypted to form the third image data. In some embodiments, operation 220 may be performed by the encryption module.

The third image data may refer to image data formed by storing encrypted second image data into the first image data.

In some embodiments, the encryption module may encrypt the second image data using image encryption technology (such as spatial image encryption technology, compressed image encryption technology, etc.). The encryption module may store the encrypted second image data into the first image data to form the third image data. For more information about encrypting the second image data to form the third image data, please see relevant descriptions of FIG. 1 and FIG. 3.

In 230, the third image data is decrypted to form the decrypted second image data. In some embodiments, operation 230 may be performed by the decryption module.

The decrypted second image data may refer to the second image data obtained by decrypting the third image data. The sub platforms in the service platform may include a plurality of decrypted second image data.

In some embodiments, the decryption module may decrypt the third image data according to different decryption keys to form the decrypted second image data. For more information about decrypting the third image data to form the decrypted second image data, please see relevant descriptions of FIG. 1 and FIG. 3.

In 240, the one or more target images are searched in the decrypted second image data. In some embodiments, operation 240 may be performed by a search module.

The target image may refer to images required by the user, for example, images of a certain link of the production line specified by the user. In some embodiments, the user may determine search options according to actual needs. The search options may refer to search conditions entered by the user when searching the one or more target images based on the user platform, such as a search range, search accuracy, a date of searching the one or more target images, etc. For more information about the search options, please refer to relevant descriptions of FIG. 4.

In some embodiments, the sub platforms of the service platform may include a plurality of decrypted second image data. Different decrypted second image data may correspond to different links of the production line. The search module may search the one or more target images in the decrypted second image data in various ways. For example, the search module may determine the decrypted second image data that satisfies the search conditions based on the search conditions entered by the user, and determine the decrypted second image data as the one or more target images.

In some embodiments, the search module may determine the one or more image similarities through the image feature processing based on the decrypted second image data and the reference image data. The search module may obtain the one or more target images based on the one or more image similarities. For more information about obtaining the one or more target images based on the one or more image similarities, please see the relevant descriptions of FIG. 4.

In some embodiments of the present disclosure, the first image data and the second image data may be identified based on the image data of a production line. By encrypting or decrypting the image data, it can ensure that confidential data of some links of the production line may be not disclosed. By searching the one or more target images in the decrypted second image data, the users can quickly find desired images, so as to improve user experience.

FIG. 3 is a flowchart of a control method of an Industrial Internet of Things based on platform linkage according to some embodiments of the present disclosure.

Based on the above, please referring to FIG. 3, the flowchart of the control method of the Industrial Internet of Things based on platform linkage is provided according to some embodiments of the present disclosure. The control method of the Industrial Internet of Things based on platform linkage may be applied to the Industrial Internet of Things based on platform linkage in FIG. 1. Further, the control method of the Industrial Internet of Things based on platform linkage may include contents described in the following steps S1 to S7.

S1: the general platform of the sensor network platform receives the image data of a production line detected by sensors of the production line, and identifies the image data of a production line as the first image data and the second image data. The first image data may be image data that requires the management platform to perform identification processing. The second image data may be the image data that requires to be encrypted and transmitted to the service platform.

S2: the general platform of the sensor network platform encrypts and stores the second image data into the first image data to form the third image data, and sends the third image data to the corresponding sub platforms of the sensor network platform according to the types of the third image data.

S3: the sub platforms of the sensor network platform forward the received third image data to the management platform.

S4: the management platform identifies the third image data to generate the control parameters, and sends the control parameters to the production line through the sensor network platform.

S5: the management platform sends the third image data to the service platform.

S6: the sub platforms of the service platform receive the third image data and decrypt the corresponding second image data from the third image data.

S7: the general platform of the service platform summarizes all the second image data and presents the second image data to the user platform.

In some embodiments, the second image data and the first image data may be both plural. The general platform of the sensor network platform may be configured with a plurality of serial numbers of the first image data. The general platform of the sensor network platform may be configured with encryption keys corresponding to different second image data.

When the general platform of the sensor network platform encrypts and stores the second image data into the first image data to form the third image data, the general platform of the sensor network platform may encrypt and store the second image data into the first image data according to the encryption keys corresponding to the second image data, and assign the serial numbers corresponding to the first image data to the corresponding third image data.

The general platform of the sensor network platform may classify the third image data according to the serial numbers of the third image data, and send the third image data to the corresponding sub platforms of the sensor network according to the types of the third image data.

In some embodiments, the sub platforms of the service platform may be configured with decryption keys corresponding to different second image data.

When the sub platforms of the service platform receive all the third image data, the sub platforms of the service platform may identify the third image data according to the serial numbers of the third image data, and extract the second image data from the identified third image data according to the decryption keys.

In some embodiments, the encryption keys may be configured as a first target pixel column and a second target pixel column.

When the general platform of the sensor network platform encrypts and stores the second image data into the first image data to form the third image data, the general platform of the sensor network platform may obtain the pixel values of all pixels of the second image data as the first pixel values, and sort the first pixel values according to positions of corresponding pixels to form the first pixel sequence.

The general platform of the sensor network platform may extract the pixel values corresponding to the first target pixel column from the first image data as the plurality of second pixel values, and extract the pixel values corresponding to the second target pixel column as the plurality of third pixel values.

The general platform of the sensor network platform may obtain the absolute values of the differences between the third pixel values and the corresponding second pixel values as the differences to be corrected. The plurality of the differences to be corrected may be sorted along the first target pixel column to form the second pixel sequence.

The general platform of the sensor network platform may assign the first pixel values to the differences to be corrected according to the corresponding relationship between the first pixel sequence and the second pixel sequence to form the encrypted differences.

The general platform of the sensor network platform may synchronously adjust the third pixel values and the second pixel values to form the third image data according to the encrypted differences.

In some embodiments, when the sub platforms of the service platform receive all the third image data, the sub platforms of the service platform may identify the third image data according to the serial numbers of the third image data, and identify the first target pixel column and the second target pixel column from the third image data according to the decryption keys configured on the sub platforms of the service platform.

The sub platforms of the service platform may restore the second image data according to the identified differences between the first target pixel column and the second target pixel column.

Figure 4:
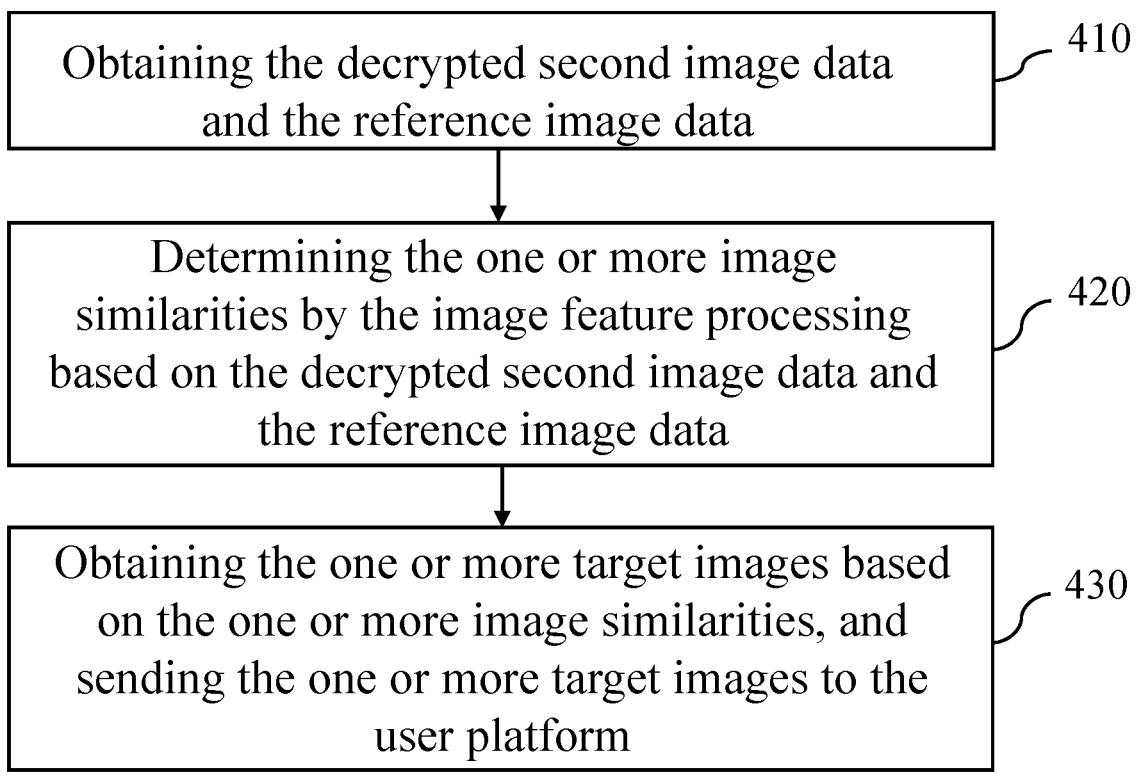
FIG. 4 is an exemplary flowchart of a method of obtaining one or more target images according to some embodiments of the present disclosure.

FIG. 4 is an exemplary flowchart of a method of obtaining one or more target images according to some embodiments of the present disclosure. In some embodiments, the process 400 may be performed by a service platform. As shown in FIG. 4, the process 400 may include the following operations.

In some embodiments, the control method of the Industrial Internet of Things based on platform linkage may be used for production management of various production lines, for example, the production management of a production line for producing metal stamping parts (e.g., alloy tableware production lines, automobile alloy parts production lines, etc.). The production line may include different links. For example, the production line for producing metal stamping parts may include the first link (blanking link), the second link (stamping link), the third link (finishing link), the fourth link (cleaning link), etc. Corresponding sensors of the production line may be set in different links of the production line for producing metal stamping parts. In some embodiments, the image data of a production line may include image data obtained from each sensor of the production line in the production line for producing metal stamping parts.

In 410, the decrypted second image data and the reference image data are obtained.

In some embodiments, the reference image data may refer to standard image data on the production line. Each link of the production line may correspond to the reference image data. The reference image data may be image data corresponding to a historical process image.

In some embodiments, the service platform may preset the reference image data in advance. For example, the service platform may select one of a plurality of historical process images of a certain link as the reference image data corresponding to the link. In some embodiments, the service platform may regularly update the reference image data according to actual needs. In some embodiments, the service platform may obtain the second image data decrypted by the decryption module. For more information about obtaining the decrypted second image data, please see the relevant descriptions of FIG. 3.

In 420, based on the decrypted second image data and the reference image data, the one or more image similarities are determined by the image feature processing.

An image similarity may express a similarity between two image data. For example, the image similarity may indicate a degree of similarity between the decrypted second image data and the reference image data.

In some embodiments, the one or more image similarities may include one or more first image similarities and one or more second image similarities. The one or more first image similarities may refer to one or more similarities between the decrypted second image data obtained based on image features and the reference image data. The one or more second image similarities may refer to one or more similarities between the decrypted second image data obtained by a machine learning model (e. g., a judgment model) and the reference image data. For more information about the one or more second image similarities, please see FIG. 5 and its related descriptions.

In some embodiments, the service platform may form feature vectors respectively by extracting image features of the plurality of decrypted second image data and/or the reference image data. The service platform may calculate a vector distance between a feature vector corresponding to the decrypted second image data and a feature vector corresponding to the reference image data respectively, and determine the one or more image similarities between the decrypted second image data and the reference image data based on the vector distance. The vector distance may include cosine distance, Euclidean distance, or Hamming distance.

In some embodiments, the service platform may extract first features. corresponding to the decrypted second image data based on the decrypted second image data. The second features corresponding to the reference image data may be extracted based on the reference image data. The one or more first image similarities may be determined based on the first features and the second features.

The first features may refer to features including information of the decrypted second image data. The second features may refer to features including information of the reference image data. The information of the second image data or information of the reference image data may include information such as color, texture, shape, and spatial relationship. The first features and/or the second features may be histogram of oriented gradient (HOG) features. The first features and/or the second features may be represented by the feature vectors. For example, the first feature may be represented by a first feature vector. The second feature may be represented by a second feature vector.

In some embodiments, the service platform may extract the first features and the second features in a variety of methods. For example, the service platform may adopt a variety of image feature extraction methods, for example, histogram of oriented gradient (HOG), local binary pattern (LBP), scale invariant feature transform (SIFT), and other extraction methods. The service platform may extract the first features of the decrypted second image data and the second features of the reference image data through above extraction method. The first features and the second features may be the HOG features.

In some embodiments, the service platform may calculate the vector distance between the feature vector (the first features) of the decrypted second image data and the feature vector (the second features) of the reference image data. The one or more first image similarities may be determined based on the vector distance (e.g., Euclidean distance, cosine distance, etc.).

In some embodiments of the present disclosure, the service platform may determine the one or more first image similarities based on features of the image data (such as HOG features, etc.), which can improve accuracy of the one or more first image similarities, and then improve accuracy of subsequent obtained one or more target images.

In some embodiments, the service platform may determine the one or more second image similarities through a machine learning model (e.g., a judgment model) based on the decrypted second image data and reference image data. For more information about determining the one or more second image similarities through the judgment model, please see FIG. 5 and its related descriptions.

In some embodiments, the service platform may determine the one or more image similarities by weighted summation based on the one or more first image similarities and the one or more second image similarities.

In some embodiments, the service platform may determine a weight of the one or more first image similarities and a weight of the one or more second image similarities according to the search options. The search range, the search accuracy, a date of search image, etc., have a corresponding relationship with the weight of the one or more first image similarities and the weight of the one or more second image similarities. For example, a size of the search range, a degree of the search accuracy, or a length of time between a date of search images and a current date may be inversely proportional to the weight of the one or more first image similarities and directly proportional to the weight of the one or more second image similarities. In some embodiments, the weight of the one or more first image similarities and the weight of the one or more second image similarities may be set according to actual needs.

In some embodiments, the service platform may determine the weight of the one or more first image similarities and the weight of the one or more second image similarities according to corresponding relationships between different search options and the weight of the one or more first image similarities and the weight of the one or more second image similarities. The service platform may determine the one or more image similarities by weighted summation based on weights of the one or more first image similarities, the one or more second image similarities, the weight of the one or more first image similarities, and the weight of the one or more second image similarities.

In some embodiments of the present disclosure, the service platform may determine the one or more image similarities by weighted summation based on the one or more first image similarities and the one or more second image similarities, which can further improve the accuracy of image similarity, and then improve the accuracy of subsequent obtained one or more target images.

In 430, the one or more target images are obtained based on the one or more image similarities, and the one or more target images are sent to the user platform.

In some embodiments, the service platform may obtain the one or more target images based on the one or more image similarities. In some embodiments, the service platform may send the obtained one or more target images to the user platform. The users may view the one or more target images through the user platform.

In some embodiments, the service platform may obtain the decrypted second image data corresponding to a maximum similarity between the decrypted second image data and the reference image data or corresponding decrypted second image data whose similarity may be higher than a preset threshold. The service platform may take corresponding one or more decrypted images of the second image data as the one or more target images.

In some embodiments, the service platform may calculate similarities between feature vectors corresponding to the decrypted second image data and feature vectors corresponding to the reference image data respectively. For example, the service platform may obtain the maximum similarity through comparison or sorting. The service platform may take the one or more decrypted images of the decrypted second image data corresponding to the maximum similarity as the one or more target images. For another example, the service platform may select the one or more decrypted images of the decrypted second image data whose one or more similarities are higher than the preset threshold as the one or more target images. The preset threshold may refer to a minimum value of the similarities. When the one or more similarities are higher than the preset threshold, the one or more decrypted images of the decrypted second image data may be used as the one or more target images. For example, the preset threshold may be set to 80%. The one or more similarities calculated by the service platform may be 40%, 85%, and 90%, then images of the decrypted second image data with similarities of 85% and 90% may be taken as the target images. In some embodiments, the preset threshold may be artificially preset. In some embodiments, the service platform may determine the preset threshold through a plurality of historical data, such as historical similarity data.

In some embodiments of the present disclosure, the service platform may obtain the one or more target images based on the one or more image similarities, which may accurately find the one or more target images. In some embodiments of the present disclosure, the service platform may determine the one or more target images by the maximum similarity or similarities higher than the preset threshold, which can more accurately find the one or more target images. Searching the one or more target images by the preset threshold effectively avoids influences of calculation error or individual data calculation error, which can improve accuracy of a result of searching the one or more target images.

Figure 5:
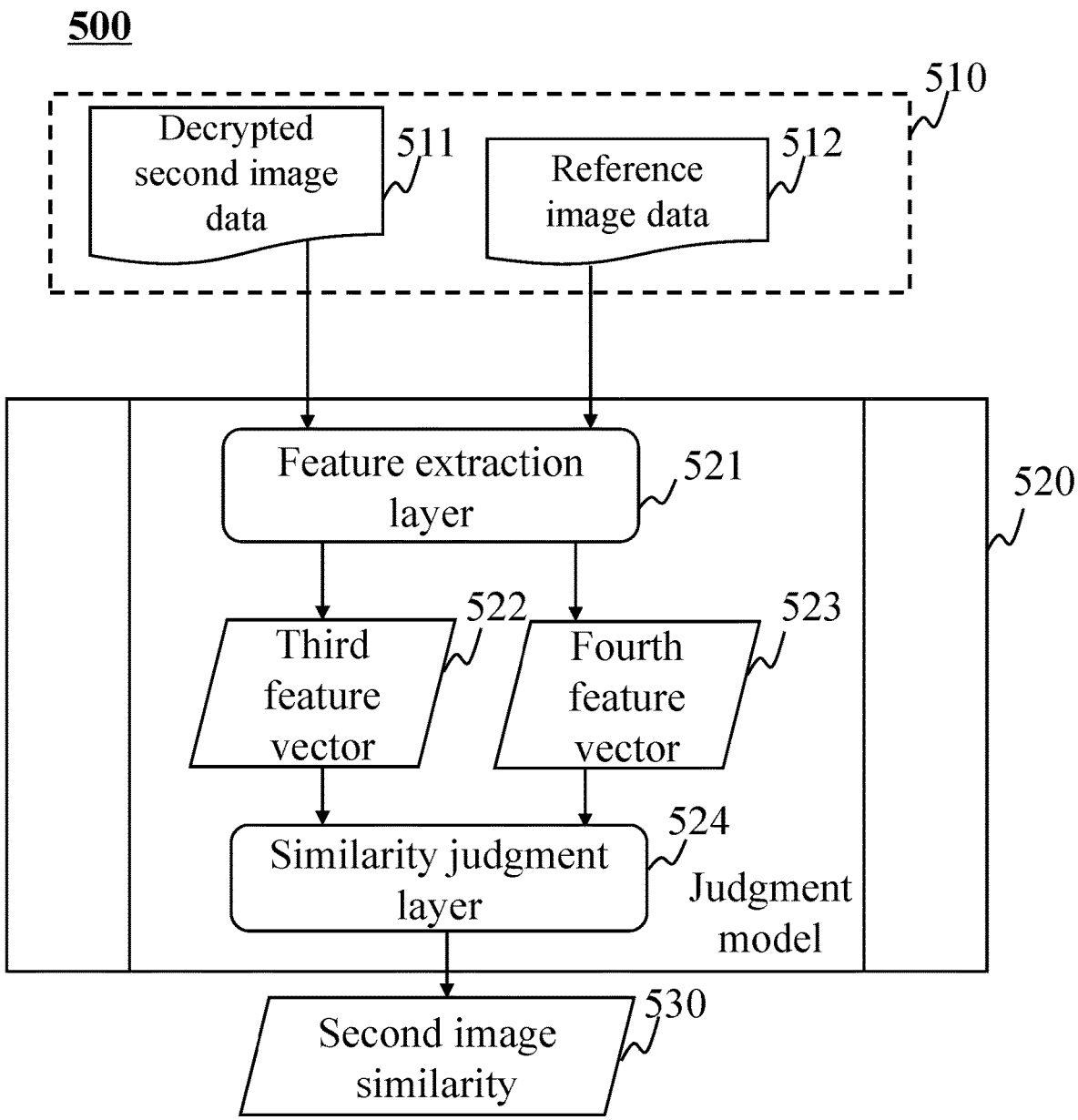
FIG. 5 is an exemplary schematic diagram for determining a similarity of the second image through a judgment model according to some embodiments of the present disclosure.

FIG. 5 is an exemplary schematic diagram for determining one or more second image similarities through a judgment model according to some embodiments of the present disclosure. In some embodiments, the process 500 may be performed by the service platform.

In some embodiments, the service platform may determine the one or more second image similarities through the judgment model based on the decrypted second image data and the reference image data. The judgment model may be a machine learning model.

A judgment model 520 may refer to a model that may determine the one or more similarities between the decrypted second image data and the reference image data. The judgment model may be a machine learning model. In some embodiments, a type of the judgment model may include neural network, depth neural network, convolution neural network, etc., and a selection of model type may be determined according to a specific situation.

In some embodiments, inputs of the judgment model may include decrypted second image data 511 and reference image data 512. Output of the judgment model may include the second image similarity 530.

In some embodiments, an initial judgment model may be trained to obtain the judgment model based on a plurality of groups of training data and corresponding label of each group of the training data. For specific description of a training process of the judgment model, please see relevant descriptions of FIG. 6 and FIG. 7.

In some embodiments, the service platform may input the decrypted second image data and the reference image data into the judgment model, and the judgment model may output the second image similarity.

In some embodiments, the judgment model 520 may include a feature extraction layer 521 and a similarity judgment layer 524. The feature extraction layer may process the decrypted second image data and the reference image data to determine a third feature vector corresponding to the decrypted second image data and a fourth feature vector corresponding to the reference image data. The similarity judgment layer may process the third feature vector and the fourth feature vector to determine the second image similarity.

In some embodiments, the feature extraction layer 521 may be a convolutional neural network, or the like. The feature extraction layer may extract a feature vector of the image data. An input of the feature extraction layer may be a pair of the image data, for example, the decrypted second image data 511 and the reference image data 512. An output of the feature extraction layer may be a feature vector of the image data, for example, the third feature vector corresponding to the decrypted second image data and the fourth feature vector corresponding to the reference image data.

The third feature vector 522 may represent image features of the decrypted second image data. The fourth feature vector 523 may represent image features of the reference image data.

In some embodiments, the similarity judgment layer 524 may be a deep neural network, or the like. The similarity judgment layer may judge the similarity between two image data. Inputs of the similarity judgment layer may be a pair of feature vectors, for example, the third feature vector corresponding to the decrypted second image data and the fourth feature vector corresponding to the reference image data. Outputs of the feature extraction layer may be the second image similarity 530.

In some embodiments, the judgment model may be obtained through joint training of the feature extraction layer and the similarity judgment layer based on the plurality of groups of training data and corresponding labels of the groups of training data.

In some embodiments of the present disclosure, determining the one or more second image similarities through the judgment model can improve accuracy of the one or more second image similarities, which may be conducive to improving accuracy of the one or more image similarities. In some embodiments of the present disclosure, the accuracy of the one or more second image similarities may be further improved by determining the one or more second image similarities through the feature extraction layer and the similarity judgment layer.

Figure 6:
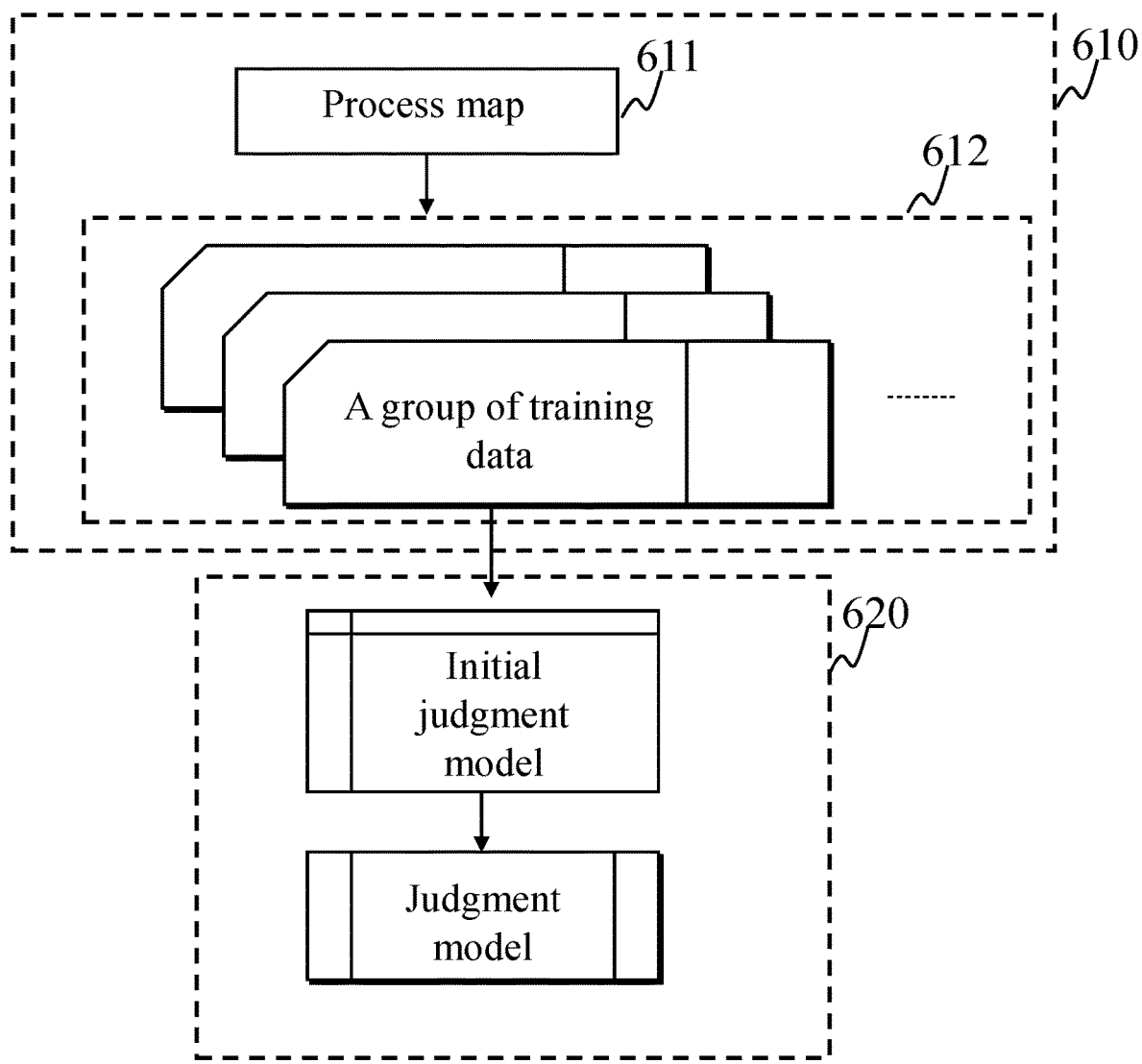
FIG. 6 is an exemplary schematic diagram of a training process of a judgment model according to some embodiments of the present disclosure.

FIG. 6 is an exemplary schematic diagram of a training process of a judgment model according to some embodiments of the present disclosure. In some embodiments, the process 600 may be performed by the service platform.

In some embodiments, the training module may obtain the plurality of groups of training data and the corresponding labels of the groups of training data. Each group of the training data in the plurality of groups of training data may include two sample image data, and a label may be a similarity of the two sample image data. Based on the plurality of groups of training data, the service platform may train the initial judgment model to obtain the judgment model.

In 610, the plurality of groups of training data and the corresponding labels of the plurality of groups of training data are obtained.

In some embodiments, each group of the training data in the plurality of groups of training data may include two sample image data. The label corresponding to each group of training data may be a similarity of the two sample image data. The plurality of groups of training data may be obtained based on historical data, and the labels of the training data may be determined by manual annotation or automatic annotation.

In some embodiments, the service platform may determine the plurality of groups of training data 612 based on the process map 611.

The process map 611 may reflect a relationship between the image data of each link in the production line. For example, the process map of the production line for producing metal stamping parts may reflect the relationship between the image data of each link of the production line for producing metal stamping parts.

In some embodiments, the process map may include nodes and edges. The nodes of the process map may include image nodes, feature nodes, feature type nodes, etc. The image nodes may correspond to historical process images.

For example, the image nodes may correspond to the image data of the production line (such as image data of different process links obtained by the sensors of each production line in the production line for producing metal stamping parts). For example, an image node 1 may correspond to historical process images of a blanking link. An image node 2 may correspond to historical process images of a finishing link. Different image nodes may be different historical process images of a same process link. The image nodes may reflect relevant data of historical process images of different process links. Node attributes of the image nodes may include different links, process parameters, product parameters, etc. corresponding to the historical process images. For example, node attributes of the image node 1 may include a product parameter thickness value 1.

In some embodiments, the feature nodes may reflect process and/or product features of different process links in a production line (e. g., the production line for producing metal stamping parts, etc.). The node attributes of the feature nodes may include process parameter values and/or product parameter values. The process parameter values and/or the product parameter values may reflect different parameter values of processes and/or products in different process links. For example, the process parameter values may include stamping pressure values, processing time values, etc. For another example, the product parameter values may include a thickness value 1 (node attribute of a feature node 1), a raw material component 1 (node attribute of a feature node 2), etc.

In some embodiments, the feature type nodes may reflect specific types of processes and/or products of different process links in the production line (e.g., the production line for producing metal stamping parts, etc.). Node attributes of the feature type nodes may include types of process parameters or product parameters. For example, node attribute of feature type node 1 may be thickness, node attribute of a feature type node 2 may be raw material composition, node attribute of a feature type node 3 may be defects, and the defects may include fracture, wrinkle, rebound, etc.

In some embodiments, the edges of the process map may be used to connect two associated nodes. The two associated nodes may mean that two nodes include same or similar node attributes. For example, node attribute of the image node 1 may include the product parameter thickness value 1, and node attribute of the feature node 1 may be a thickness value 1. The service platform may connect the image node 1 with the feature node 1 to determine a connecting line as an edge of the process map. As another example, the node attribute of the feature type node 1 may be thickness, and the type corresponding to the node attribute thickness value 1 of the feature node 1 may be thickness. The service platform may connect the feature type node 1 and the feature node 1 to determine a connecting line as another edge of the process map.

In some embodiments, the service platform may construct a process map based on the historical process images. For example, the service platform may obtain a plurality of historical process images. The service platform may obtain nodes of the process map based on the plurality of historical process images, process and/or product features corresponding to the plurality of historical process images, and feature types corresponding to the process and/or product features. The service platform may connect the two associated nodes to determine the edge of the process map.

In some embodiments, the service platform may select historical process images corresponding to two image nodes based on the process map. The service platform may determine two historical process images as two sample image data, and then determine them as a group of training data. The service platform may determine the plurality of groups of training data based on the process map, and each group of the training data may include two images (e.g., two historical process images).

In some embodiments, the service platform may obtain common feature nodes and difference feature nodes of the two sample image data based on the process map. Based on the common feature nodes, the first number of the common feature nodes may be determined. Based on the difference feature nodes, a second number of the difference feature nodes belonging to a same feature type in the difference feature nodes may be determined. The first judgment result may be determined based on the first number and the first preset threshold. The second judgment result may be determined based on the second number and the second preset threshold. Based on the first judgment result and the second judgment result, the plurality of groups of training data may be determined. For more descriptions, please refer to relevant descriptions of FIG. 7.

In some embodiments of the present disclosure, the service platform may determine the plurality of groups of training data based on the process map that can reflect the relationship between the image data of each link in the production line. Diversity of determined plurality of groups of training data may be ensured, and the accuracy of the one or more second image similarities of the one or more outputs of the judgment model obtained by training may be improved.

In 620, based on the plurality of groups of training data, the initial judgment model is trained to obtain the judgment model.

In some embodiments, the service platform may input the plurality of groups of training data with labels into the initial judgment model. Parameters of the initial judgment model may be updated through training. When trained judgment model satisfies preset conditions, the training may end and the trained judgment model may be obtained. The preset conditions may be a count of updates, an accuracy threshold of outputs of the judgment model, or the like. For example, the service platform may input the plurality of groups of data with labels into the trained judgment model. When the accuracy between the one or more outputs of the judgment model and the labels are greater than the accuracy threshold, the training may end and the trained judgment model may be obtained.

Figure 7:
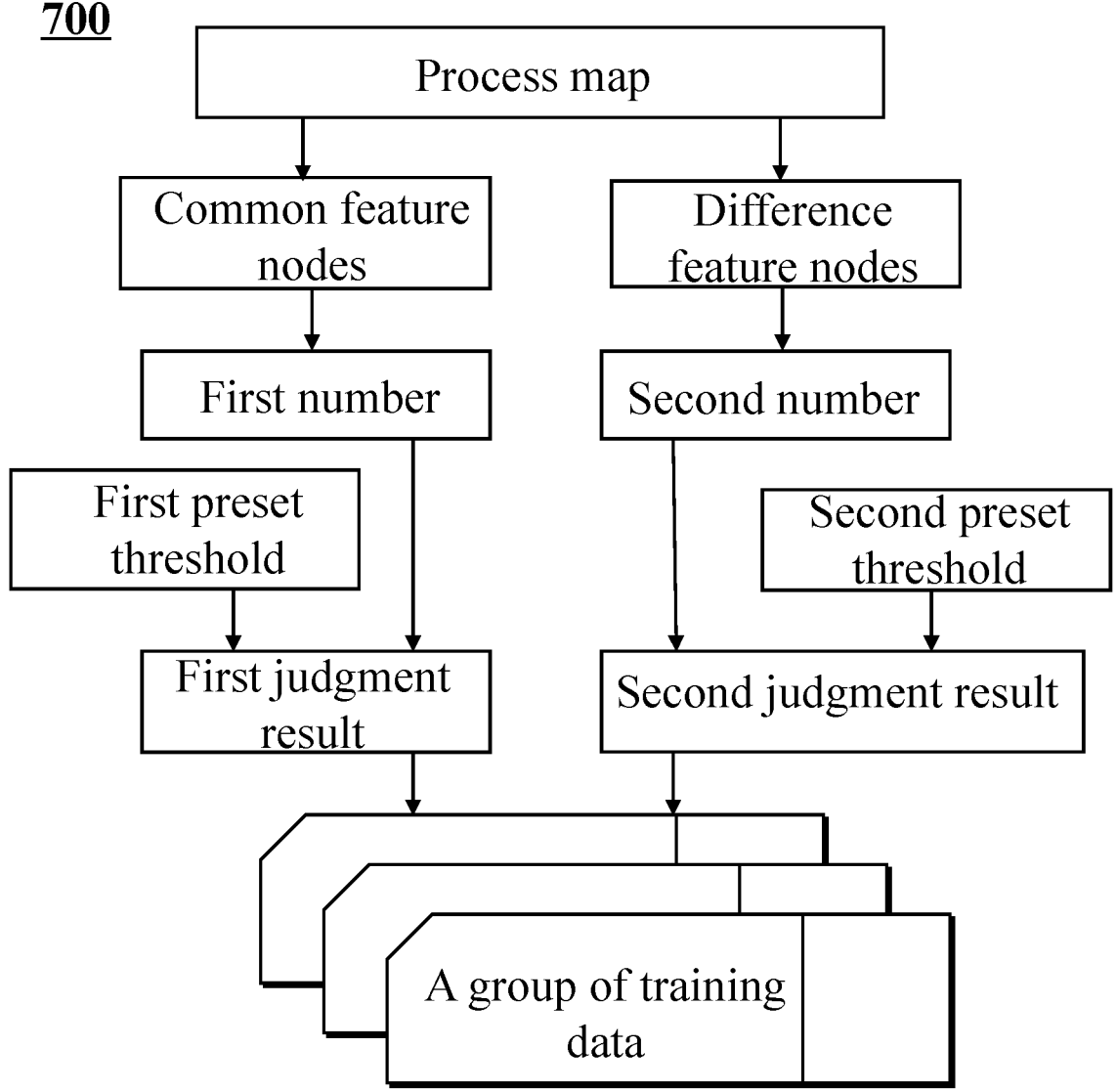
FIG. 7 is an exemplary schematic diagram for determining a plurality of groups of training data based on a first judgment result and a second judgment result according to some embodiments of the present disclosure.

FIG. 7 is an exemplary schematic diagram for determining a plurality of groups of training data based on a first judgment result and a second judgment result according to some embodiments of the present disclosure. In some embodiments, the process 700 may be performed by the service platform.

In some embodiments, the training module may obtain the common feature nodes and the difference feature nodes of two historical process images based on the process map.

A common feature node may refer to a feature node in which two image nodes corresponding to two historical process images have edges. A difference feature node may refer to a feature node in which one of the two image nodes corresponding to two historical process images has an edge and the other has no edge. The difference feature node may include two types of nodes. For example, the two image nodes may be an image node 3 and an image node 4, respectively. The difference feature node may include a difference feature node that has an edge with the image node 3 but has no edge with the image node 4, and a difference feature node that has no edge with the image node 3 but has an edge with the image node 4.

In some embodiments, the service platform may obtain the two image nodes corresponding to two historical process images based on the process map. The service platform may obtain the feature nodes that have edges with one of the two image nodes respectively. The service platform may compare whether corresponding feature nodes of the two image nodes are the same, and then obtain the common feature nodes and difference feature nodes.

In some embodiments, the service platform may determine the first number of the common feature nodes based on the common feature nodes. The service platform may determine the second number of the difference feature nodes belonging to the same feature type in the difference feature nodes based on the difference feature nodes.

The first number may refer to a count of common feature nodes. For example, the first number may be 5, 10, etc.

The second number may refer to a count of the difference feature nodes belonging to the same feature type in the difference feature nodes. For example, the difference feature nodes that have edges with the image node 3 but no edges with the image node 4 may be a feature node a, a feature node b, and a feature node c. The feature nodes that do not have edges with the image node 3 but have edges with the image node 4 may be a feature node d, a feature node e, and a feature node f. The feature node a and the feature node d may belong to the same feature type. The feature node b and the feature node f may belong to the same feature type. The feature node c and the feature node e may do not belong to the same feature type. The second number of the image node 3 and the image node 4 may be 2.

In some embodiments, the service platform may determine the number of the common feature nodes as the first number. In some embodiments, the service platform may determine a feature type node connected to the difference feature nodes based on the difference feature nodes. The service platform may determine the second number of the difference feature nodes belonging to the same feature type in the difference feature nodes based on the feature type nodes.

In some embodiments, the service platform may determine the first judgment result based on the first number and the first preset threshold. The service platform may determine the second judgment result based on the second number and the second preset threshold.

The first preset threshold may refer to a minimum value of the first number of the common feature nodes. When the first number corresponding to two historical process images is greater than the first preset threshold, the possibility of the two historical process images being similar may be great. When the first number corresponding to two historical process images is less than the first preset threshold, the possibility of the two historical process images being similar may be small. The second preset threshold may refer to a maximum value of the second number. When the second number corresponding to two historical process images is less than the second preset threshold, the possibility of the two historical process images being similar may be great. When the second number corresponding to two historical process images is greater than the second preset threshold, the possibility of the two historical process images being similar may be small. In some embodiments, the service platform may preset the first preset threshold and the second preset threshold according to actual needs.

The first judgment result may be a comparison result of the first number and the first preset threshold. The second judgment result may be a comparison result of the second number and the second preset threshold. The first judgment result and/or the second judgment result may include that the possibility of the two historical process images being similar is great, the possibility the two historical process images being similar is small, or the like.

In some embodiments, the service platform may determine the first judgment result based on the first number and the first preset threshold. For example, when the first number is greater than the first preset threshold, the service platform may determine that the first judgment result is that possibility of the two historical process images being similar is great. When the first number is less than the first preset threshold, the service platform may determine that the first judgment result is that possibility of the two historical process images being similar is small. In some embodiments, the service platform may determine the second judgment result based on the second number and the second preset threshold. For example, when the second number is less than the second preset threshold, the service platform may determine that the second judgment result is that possibility of the two historical process images being similar is great. When the second number is greater than the second preset threshold, the service platform may determine that the second judgment result is that possibility of the two historical process images being similar is small.

In some embodiments, the service platform may determine the plurality of groups of training data based on the first judgment result and the second judgment result. For example, when the first judgment result and the second judgment result are both that the possibility of the two historical process images being similar is great, the service platform may determine the above historical process images as a group of training data (two sample image data). The group of the training data may be positive sample pairs, and the labels may be similar. As another example, when at least one of the first judgment result and the second judgment result are that the possibility of two historical process images being similar is small, the service platform may determine the two historical process images as a group of training data (two sample image data). The group of training data may be a negative sample pair, and the label may be not similar. The service platform may determine the plurality of groups of training data through a plurality of groups of historical process images.

In some embodiments, the label of each group of training data may be a similarity between corresponding two historical process images. The similarity between two historical process images may be a ratio of twice of the first number of the common feature nodes to a total number. The total number may be a count of feature nodes connected to the image nodes corresponding to the two historical process images. For example, the number of feature nodes connected to an image node 5 corresponding to a historical process image 1 is 5. The number of feature nodes connected to an image node 6 corresponding to a historical process image 2 is 4. A first number of the common feature nodes of the image node 5 and the image node 6 is 3. A similarity between the historical process image 1 and the historical process image 2 is 66.7%, and the similarity=3*2/(5+4).

In some embodiments of the present disclosure, the service platform may obtain the common feature nodes and the difference feature nodes of two historical process images based on the process map. The service platform further determines whether the two historical process images are positive sample pairs or negative sample pairs, and then determines the plurality of groups of training data. The service platform may comprehensively judge a similarity of the two historical process images through the process map, ensure the accuracy of the determined plurality of groups of training data and labels of the determined plurality of groups of training data, and further improve the accuracy of the one or more second image similarities of the one or more outputs of the judgment model obtained by training.

Those skilled in the art can realize that the units and algorithm steps of the examples described in combination with the embodiments disclosed herein can be implemented in electronic hardware, computer software, or a combination of the two. In order to clearly illustrate the interchangeability of hardware and software, the composition and steps of the examples have been generally described in the above description according to functions. Whether these functions are performed in hardware or software depends on the specific application of the technical scheme and the design constraints. Professional technicians can use different methods to realize the described functions for each specific application, but this realization should not be considered beyond the scope of the present disclosure.

In the several embodiments provided in the present disclosure, it should be understood that the disclosed devices and methods can be realized in other ways. For example, the device embodiments described above are only schematic. For example, the division of the unit is only a logical function division, and there may be another division method in actual implementation, for example, a plurality of units or components may be combined or integrated into another system, or some features may be ignored or not executed. In addition, the mutual coupling or direct coupling or communication connection shown or discussed can be indirect coupling or communication connection through some interfaces, devices or units, or electrical, mechanical or other forms of connection.

The units described as separate components can be or may not be physically separated. As units, it is obvious that those skilled in the art can realize that the units and algorithm steps of the examples described in combination with the embodiments disclosed herein can be implemented in electronic hardware, computer software, or a combination of the two. In order to clearly illustrate the interchangeability of hardware and software. In the above description, the composition and steps of each example have been generally described according to the function. Whether these functions are performed in hardware or software depends on the specific application of the technical scheme and the design constraints. Professional technicians can use different methods to realize the described functions for each specific application, but this realization should not be considered beyond the scope of the present disclosure.

In addition, the functional units in the various embodiments of the present disclosure can be integrated into a processing unit, or each unit can exist separately, or two or more units can be integrated into a unit. The above integrated units can be realized in the form of hardware or software functional units.

The integrated unit can be stored in a computer readable storage medium if it is implemented in the form of a software functional unit and sold or used as an independent product. Based on this understanding, the technical solution of the present disclosure, in essence, or the part that contributes to the existing technology, or all or part of the technical solution, can be embodied in the form of a software product, which is stored in a storage medium. It includes several instructions to enable a computer device (which can be a personal computer, a server, or a grid device, etc.) to perform all or part of the steps of the methods described in the various embodiments of the present disclosure. The aforementioned storage media include USB flash disk, mobile hard disk, read only memory (ROM), random access memory (RAM), magnetic disc or optical disc and other media that can store program codes.

The specific implementation mode described above further describes the purpose, technical scheme, and beneficial effects of the present disclosure. It should be understood that the above description is only the specific implementation mode of the present disclosure and is not used to limit the protection scope of the present disclosure. Any modification, equivalent replacement, improvement, etc. made within the spirit and principles of the present disclosure should be included in the scope of protection of the present disclosure.

What is claimed is:

1. An Industrial Internet of Things (IIoT) system for industrial production data management, comprising:
a non-transitory computer-readable storage medium storing executable instructions; and
at least one processor in communication with the non-transitory computer-readable storage medium, when executing the executable instructions, the at least one processor is directed to cause the IIoT system to:
identify first image data and second image data based on image data of a production line;
encrypt the second image data to form third image data;
decrypt the third image data to form decrypted second image data;
obtain reference image data;
determine image similarities through image feature processing based on the decrypted second image data and the reference image data, wherein the image similarities include first image similarities and second image similarities, and the second image similarities are determined by a judgment model based on the decrypted second image data and the reference image data, wherein the judgment model is a machine learning model; and
obtain target images based on the image similarities and send the target images to a user platform.

2. The IIoT system for industrial production data management of claim 1, wherein the at least one processor is further directed to cause the IIoT system to:
extract first features corresponding to the decrypted second image data based on the decrypted second image data;
extract second features corresponding to the reference image data based on the reference image data; and
determine the first image similarities based on the first features and the second features.

3. The IIoT system for industrial production data management of claim 1, wherein the judgment model includes a feature extraction layer and a similarity judgment layer;
the feature extraction layer is configured to process the decrypted second image data and the reference image data to determine a third feature vector corresponding to the decrypted second image data and a fourth feature vector corresponding to the reference image data; and
the similarity judgment layer is configured to process the third feature vector and the fourth feature vector to determine the second image similarities.

4. The IIoT system for industrial production data management of claim 1, wherein the judgment model is obtained through training based on a plurality of groups of training data and labels, wherein each group of the training data in the plurality of groups of training data includes two sample image data, and label of the group of the training data is a similarity of the two sample image data, wherein the at least one processor is further directed to cause the IIoT system to:

determine the plurality of groups of training data based on a process map, wherein nodes of the process map include image nodes, feature nodes, and feature type nodes, and edges of the process map are used to connect two associated nodes, wherein the image nodes correspond to historical process images, node attributes of the feature nodes include process parameters or product parameters, and node attributes of the feature type nodes include types of process parameters or product parameters.

5. The IIoT system for industrial production data management of claim 4, wherein the at least one processor is further directed to cause the IIoT system to:

obtain common feature nodes and difference feature nodes of two historical process images based on the process map;

determine a first number of the common feature nodes based on the common feature nodes, and determine a second number of the difference feature nodes belonging to a same feature type in the difference feature nodes based on the difference feature nodes;

determine a first judgment result based on the first number and a first preset threshold;

determine a second judgment result based on the second number and a second preset threshold; and determine the plurality of groups of training data based on the first judgment result and the second judgment result.

6. The IIoT system for industrial production data management of claim 1, wherein the at least one processor is further directed to cause the IIoT system to:

obtain corresponding decrypted second image data whose a similarity with the reference image data meets a preset condition, wherein the preset condition includes the similarity being maximum or the similarity being higher a preset threshold; and take images of the corresponding decrypted second image data as the target images.

7. The IIoT system for industrial production data management of claim 1, further comprising: a service platform, a management platform, and a sensor network platform that are interacted sequentially from top to bottom, wherein the sensor network platform includes a general platform of the sensor network platform and a plurality of sub platforms of the sensor network platform, and the service platform includes a general platform of the service platform and a plurality of sub platforms of the service platform, wherein the at least one processor is further directed to cause the IIoT system to:

receive the image data of the production line detected by sensors of the production line, and identify the image data of the production line as the first image data and the second image data, wherein the first image data is image data that requires the management platform to perform identification processing, and the second image data is image data that requires to be encrypted and transmitted to the service platform;

encrypt and store the second image data into the first image data to form the third image data, and send the third image data to corresponding sub platforms of the sensor network platform according to types of the third image data;

forward the received third image data to the management platform;

identify the third image data to generate control parameters, and send the control parameters to the production line through the sensor network platform; and send the third image data to the service platform;

receive the third image data and decrypt the corresponding second image data from the third image data; and summarize all the second image data and present the second image data to a user platform.

8. The IIoT system for industrial production data management of claim 7, wherein the second image data and the first image data are both plural, the general platform of the sensor network platform is configured with a plurality of serial numbers of the first image data, and the general platform of the sensor network platform is configured with encryption keys corresponding to different second image data;

when encrypting and storing the second image data into the first image data to form the third image data, the at least one processor is further directed to cause the IIoT system to encrypt and store the second image data into the first image data according to the encryption keys corresponding to the second image data, and assign the serial numbers corresponding to the first image data to the corresponding third image data; and classify the third image data according to the serial numbers of the third image data and send the third image data to the corresponding sub platforms of the sensor network platform according to the types of the third image data.

9. The IIoT system for industrial production data management of claim 8, wherein the sub platforms of the service platform are configured with decryption keys corresponding to the different second image data; and when receiving the third image data, the at least one processor is further directed to cause the IIoT system to identify the third image data according to the serial numbers of the third image data, and extract the second image data from the identified third image data according to the decryption keys.

10. A control method of an Industrial Internet of Things (IIoT) system for industrial production data management, wherein the method is executed by at least one processor of the IIoT system, comprising:

identifying first image data and second image data based on image data of a production line;

encrypting the second image data to form third image data;

decrypting the third image data to form decrypted second image data;

searching one or more target images in the decrypted second image data;

obtaining reference image data;

determining image similarities through image feature processing based on the decrypted second image data and the reference image data, wherein the image similarities include first image similarities and second image similarities, and the second image similarities are determined by a judgment model based on the decrypted second image data and the reference image data, wherein the judgment model is a machine learning model; and obtaining target images based on the image similarities and send the target images to a user platform.

11. The control method of the IIoT system for industrial production data management of claim 10, wherein the first image similarities are determined by a process including:

extracting first features corresponding to the decrypted second image data based on the decrypted second image data;

extracting second features corresponding to the reference image data based on the reference image data; and determining the first image similarities based on the first features and the second features.

12. The control method of the IIoT system for industrial production data management of claim 10, wherein the judgment model includes a feature extraction layer and a similarity judgment layer;

the feature extraction layer is configured to process the decrypted second image data and the reference image data to determine a third feature vector corresponding to the decrypted second image data and a fourth feature vector corresponding to the reference image data; and the similarity judgment layer is configured to process the third feature vector and the fourth feature vector to determine the second image similarities.

13. The control method of the IIoT system for industrial production data management of claim 10, wherein the judgment model is obtained through training based on a plurality of groups of training data and labels, wherein each group of the training data in the plurality of groups of training data includes two sample image data, and label of the group of the training data is a similarity of the two sample image data, further comprising:

determining the plurality of groups of training data based on a process map, wherein nodes of the process map include image nodes, feature nodes, and feature type nodes, and edges of the process map are used to connect two associated nodes, wherein the image nodes correspond to historical process images, node attributes of the feature nodes include process parameters or product parameters, and node attributes of the feature type nodes include types of process parameters or product parameters.

14. The control method of the IIoT system for industrial production data management of claim 13, wherein determining the plurality of groups of training data based on a process map includes:

obtaining common feature nodes and difference feature nodes of two historical process images based on the process map;

determining a first number of the common feature nodes based on the common feature nodes, and determining a second number of the difference feature nodes belonging to a same feature type in the difference feature nodes based on the difference feature nodes;

determining a first judgment result based on the first number and a first preset threshold;

determining a second judgment result based on the second number and a second preset threshold; and determining the plurality of groups of training data based on the first judgment result and the second judgment result.

15. The control method of the IIoT system for industrial production data management of claim 10, further comprising:

obtaining corresponding decrypted second image data whose a similarity with the reference image data meets a preset condition, wherein the preset condition includes the similarity being maximum or the similarity being higher a preset threshold; and taking images of the corresponding decrypted second image data as the target images.

16. The control method of the IIoT system for industrial production data management of claim 10, wherein the method is applied to a service platform, a management platform, and a sensor network platform that are interacted sequentially from top to bottom, the sensor network platform includes a general platform of the sensor network platform and a plurality of sub platforms of the sensor network platform; and the service platform includes a general platform of the service platform and a plurality of sub platforms of the service platform; and the method comprises:

receiving, by the general platform of the sensor network platform, the image data of the production line detected by sensors of the production line, and identifying the image data of the production line as the first image data and the second image data, wherein the first image data is image data that requires the management platform to perform identification processing, and the second image data is image data that requires to be encrypted and transmitted to the service platform;

encrypting and storing, by the general platform of the sensor network platform, the second image data into the first image data to form the third image data, and sending the third image data to corresponding sub platforms of the sensor network according to types of the third image data;

forwarding, by the sub platforms of the sensor network platform, the received third image data to the management platform;

identifying, by the management platform, the third image data to generate control parameters, and sending the control parameters to the production line through the sensor network platform;

sending, by the management platform, the third image data to the service platform;

receiving, by the sub platforms of the service platform, the third image data and decrypting the corresponding second image data from the third image data; and summarizing, by the general platform of the sensor network platform, all the second image data and presenting the second image data to a user platform.

17. The control method of the IIoT system for industrial production data management of claim 16, wherein the second image data and the first image data are both plural, the general platform of the sensor network platform is configured with a plurality of serial numbers of the first image data, and the general platform of the sensor network platform is configured with encryption keys corresponding to different second image data;

when encrypting and storing the second image data into the first image data to form the third image data, encrypting and storing, by the general platform of the sensor network platform, the second image data into the first image data according to the encryption keys corresponding to the second image data, and assigning the serial numbers corresponding to the first image data to the corresponding third image data; and classifying, by the general platform of the sensor network platform, the third image data according to the serial numbers of the third image data and sending the third image data to the corresponding sub platforms of the sensor network platform according to the types of the third image data.

18. The control method of the IIoT system for industrial production data management of claim 17, wherein the sub platforms of the service platform are configured with decryption keys corresponding to the different second image data; and when receiving the third image data, identifying, by the sub platforms of the service platform, the third image data according to the serial numbers of the third image data, and extracting the second image data from the identified third image data according to the decryption keys.

19. A non-transitory computer-readable storage medium, wherein the storage medium stores computer instructions, and when the computer instructions are executed by a processor, the processor is directed to cause an Industrial Internet of Things (IIoT) system to:

identify first image data and second image data based on image data of a production line;

encrypt the second image data to form third image data;

decrypt the third image data to form decrypted second image data;

obtain reference image data;

determine image similarities through image feature processing based on the decrypted second image data and the reference image data, wherein the image similarities include first image similarities and second image similarities, and the second image similarities are determined by a judgment model based on the decrypted second image data and the reference image data, wherein the judgment model is a machine learning model; and obtain target images based on the image similarities and send the target images to a user platform.

* * * * *